(12) United States Patent
Pesarese et al.

(10) Patent No.: US 9,886,249 B2
(45) Date of Patent: Feb. 6, 2018

(54) UNIVERSAL TRANSCOMPILING FRAMEWORK

(71) Applicant: SAP SE, Walldorf (DE)

(72) Inventors: Marco Pesarese, Nussloch (DE); Stephan Dominik Matthee, Mosbach (DE)

(73) Assignee: SAP SE, Walldorf (DE)

( * ) Notice: Subject to any disclaimer, the term of this patent is extended or adjusted under 35 U.S.C. 154(b) by 78 days.

(21) Appl. No.: 14/941,710

(22) Filed: Nov. 16, 2015

(65) Prior Publication Data

US 2017/0139690 A1    May 18, 2017

(51) Int. Cl.
  *G06F 9/44* (2006.01)
  *G06F 9/45* (2006.01)
  *G06F 11/36* (2006.01)

(52) U.S. Cl.
  CPC ............ *G06F 8/41* (2013.01); *G06F 11/3604* (2013.01)

(58) Field of Classification Search
  None
  See application file for complete search history.

(56) References Cited

U.S. PATENT DOCUMENTS

| 7,765,539 B1* | 7/2010 | Elliott ................ G06F 8/53 717/145 |
| 2004/0111713 A1* | 6/2004 | Rioux ................. G06F 8/427 717/137 |
| 2009/0083724 A1* | 3/2009 | Eichenberger ........ G06F 8/447 717/160 |

* cited by examiner

*Primary Examiner* — Lewis A Bullock, Jr.
*Assistant Examiner* — Melissa Alfred
(74) *Attorney, Agent, or Firm* — Klarquist Sparkman, LLP

(57) ABSTRACT

Described herein is a transcompiling framework. In accordance with one aspect, the framework generates a source abstract syntax representation corresponding to source code written in a source language. The framework may determine validity of constraints of a common denominator language by parsing the source abstract syntax representation, wherein the common denominator language is a set of intersects provided by the source language and reachable by a target language. In response to determining the constraints are valid, the source abstract syntax representation may be transformed to a target syntax representation associated with the target language. The target syntax representation is then printed as transcompiled source code in the target language.

20 Claims, 6 Drawing Sheets

UNIVERSAL TRANSCOMPILING FRAMEWORK

TECHNICAL FIELD

The present disclosure relates generally to computer systems, and more specifically, to a universal transcompiling framework.

BACKGROUND

The development of client software applications typically involves a trade-off between leveraging the latest software platform for feature richness and the reuse of existing software code. With the proliferation of mobile clients and modern user interface (UI) libraries for JavaScript, software development teams are required to rewrite code over and over again, either via parallel development of similar applications for different platforms or by excluding less prominent platforms.

The ability to write software code once and use it on multiple different platforms greatly enhances the efficiency of software application development. A perfect adaption to the native platform is crucial, especially for user interfaces, the acceptance of which depends on a smooth integration of the standard look and feel of the platform.

Some platform independent libraries already exist for languages such as C++ or Java, which adapt very well and use native application programming interfaces (APIs) to provide good user experience (e.g., Java SWT or C++ boost). However, such libraries require the same base language to be executed on the target platform. This is not always possible, especially if the requirements are that the programming code has to be a base for other application developers who want to use the platform's primary language, such as JavaScript in the web browser or Node.js or Objective C for Apple devices. Developers are typically tied to platforms with the same language.

Some solutions to the problem include a low-level transformation of virtual machine (VM) byte code from one machine to another. This solution works only when a compiler that transforms the source code to VM byte code is provided and the virtual machines for source and target systems are very similar (e.g., Java VM and Microsoft .net VM). They need to be similar in various aspects, such as primitive types, garbage collection and memory management, function calling, class inheritance features, etc. Since human readable source code is not available at the target system, debugging and auto suggest features for editing the client/application code in the integrated development environment (IDE) may be restricted or even impossible.

Another solution is to use a highly specialized converter that translates one language to another. Such solution is typically restricted to a one-to-one relationship between source and target platforms (e.g., Java to JavaScript) and is often combined with the requirement to re-implement all or major parts of the APIs at the source platform, which may also cause legal issues with regard to intellectual property rights.

Yet another solution may be to define a new proprietary programming language. This solution lacks support from an existing toolchain (probably no support at all) and presents a high barrier for developers to learn and use a new proprietary language. The efficiency gained by transcompiling is lost again by a very inefficient software development cycle. Additionally, there is probably no existing runtime environment that can be used to execute, test and debug the source code.

SUMMARY

A transcompiling framework is described herein. In accordance with one aspect, the framework generates a source abstract syntax representation corresponding to source code written in a source language. The framework may determine validity of constraints of a common denominator language by parsing the source abstract syntax representation, wherein the common denominator language is a set of intersects provided by the source language and reachable by a target language. In response to determining the constraints are valid, the source abstract syntax representation may be transformed to a target syntax representation associated with the target language. The target syntax representation is then printed as transcompiled source code in the target language.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

Figure 1:
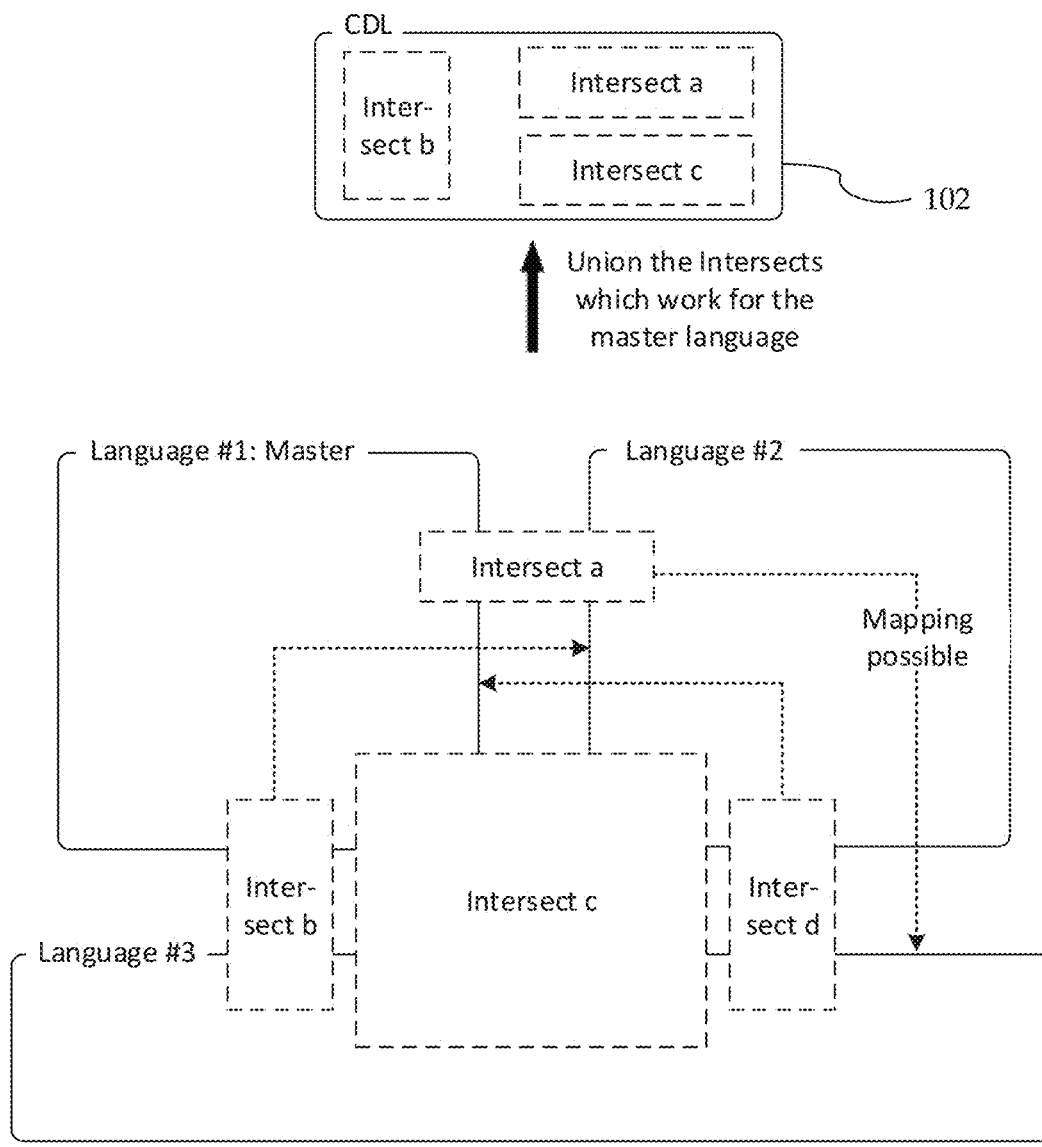
FIG. 1 illustrates a construction of a common denominator language (CDL)

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A transcompiling framework is described herein. In accordance with some implementations, source code is written in a common denominator language and transcompiled to multiple target languages. The common denominator language (CDL) may be any existing language (e.g., Java) with a reduced feature set. The supported feature set (or instruction set) may be reduced to include only common language patterns that are available on all platforms. If the source code is written within these boundaries, an automatic mapping to the target language or platform is much easier. The abstract syntax tree associated with the source code may be easily transformed to multiple language targets. The core data structures (e.g., maps, lists, etc.) and input/output (I/O) libraries may then be layered in such a way that they are replaced at the target platform with one or more native implementations or variants.

Hence, a single platform source code in a source language may be transformed into native applications for very different devices and target languages without a virtual machine in the middle tier, advantageously leading to maximize performance and very tight target architecture integration. The present transcompilation approach is universal but still practical for continuous use in the software development and production processes. It supports substantially all major languages as targets, and not only a single one. There is no need to set up different development teams to implement different software platforms. A new target language may easily be supported by adding new configuration data.

One aspect of the present approach uses an existing language as a source by restricting the feature set, instead of creating a new meta-language. This advantageously enables the software developer to write code using a familiar programming language and integrated development environment (IDE), which enhances efficiency and general acceptance. Debugging may be performed mainly on the initial source platform, thereby increasing productivity. No manual rework is required for the target platforms during development and production roundtrips. These and other features and advantages will be described in more details herein.

It should be appreciated that the framework described herein may be implemented as a method, a computer-controlled apparatus, a computer process, a computing system, or as an article of manufacture such as a non-transitory computer-usable medium. These and various other features will be apparent from the following description. It should be further appreciated that the terms "client", "developer" and "user" may be used interchangeably as appropriate without departing from the scope of this disclosure.

FIG. 1 illustrates the construction of a common denominator language (CDL) 102. The concept of a "common denominator language" (CDL) may refer to a single abstract definition of a programming language. A CDL may be constructed from any set of target languages, such as a combination of C++, Objective C, Java, C# and JavaScript languages.

An "intersect" is a language concept or feature that is available or supported similarly by two or more target languages. Examples of intersects include, but are not limited to, classes, variables, conditions, objects, loops, primitive data types, behavior (e.g., garbage collection) and so forth. A mapping is the functional equivalent of replacing a language concept on a target platform. Examples of mapping functions include, but are not limited to, adding or renaming code to achieve a specific behavior, guarantee constraints or resolve conflicts. For example, classes in Javascript do not exist natively, but can be emulated by the transcompiling framework via mapping. Although some concepts, such as interfaces and types, cannot be emulated in Javascript, such limitations generally do not restrict the functionality of the transcompiled code since they are provided merely for convenience and are not fundamentally required.

As shown in FIG. 1, three different languages (#1, #2 and #3) may have multiple intersects (a, b, c and d). Only intersect c is common to all three languages. The canonical first approach for constructing the CDL 102 may be to use the expressions of intersect c. However, the disadvantage is that if a simple intersect of the languages is performed, important features may be lost for the given set of languages. For example, the following features may not be supported: (1) classes (no direct concept in JavaScript); (2) type safety (types not available in JavaScript); (3) namespaces (not available in Objective C); and (4) Generics/Templates (not available in Objective C and JavaScript).

Alternatively, instead of creating only an intersect of all target languages, intersects of all reachable features may be collected to construct the CDL 102. An intersect may be defined as "reachable" if there are semantic mapping paths available from the intersect into all target languages that are not part of this intersect. A semantic mapping is a one-way transformation (directed edge) of an expression from one language to another, which does not provide a direct representation of the expression. A good example is the "class" concept of Java, which does not exist directly in JavaScript, but can be reconstructed using the prototype expression. A reverse mapping, on the other hand, may be very difficult or impossible, because ambiguities exist. Such a one-way-mapping is the domain of a classic compiler, where higher-level constructs are compiled into low-level expression entities. In FIG. 1, the CDL may be constructed from the union of intersects (e.g., a, b and c) that are reachable by the master language (e.g., language #1). If language #1 is selected as the master language, intersect d cannot be used even if a mapping into #1 exists, since intersect d is not a feature of language #1.

A Common Denominator Language (CDL) may be regarded as a set of features that needs to be validated during construction (or compile-time) for syntax correctness. A new language representing the CDL may be created, so that it can be directly transformed from this representation into CDL. This may provide the advantage that an intersect d in FIG. 1 can be used. Alternatively, an existing language (e.g., Java) may be re-used. This language may be called the source or master language.

Figure 2:
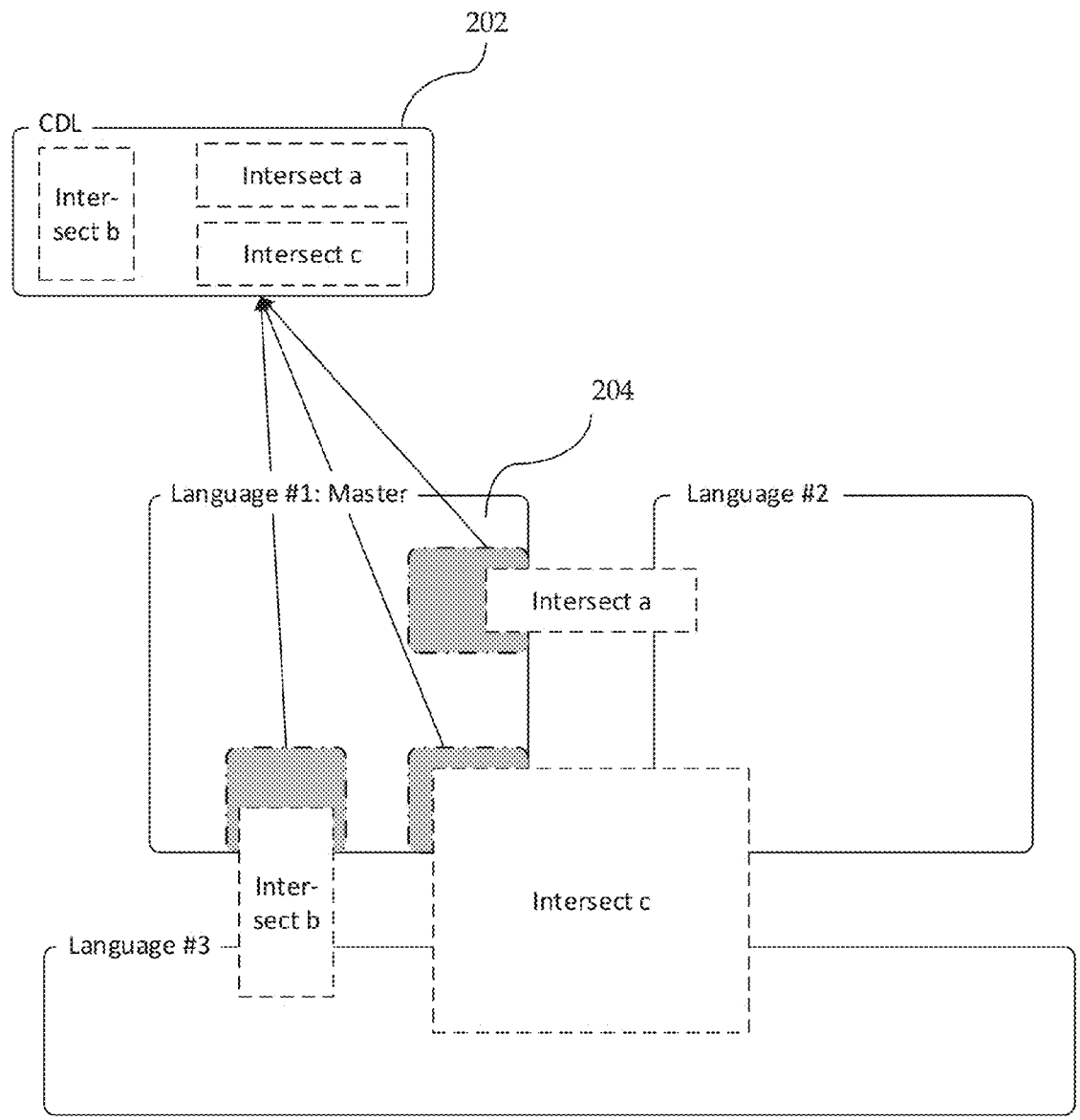
FIG. 2 shows intersects that are selected to define the common denominator language.

FIG. 2 shows intersects (a, b and c) that are selected to define the common denominator language (CDL) 202. The selected intersects are common to the master language and one or more target languages (e.g., languages #2 and #3). The arrows select the features of the three languages (#1, #2 and #3) that form the CDL. The CDL may be documented and tested by a verification step in the transcompiling framework. Features that are not part of the CDL are marked as errors, even if the native compiler of the host language (e.g., Java) can handle them. The syntactical check is performed based on the features indicated by the arrows.

One advantage of using an existing language as the source language is that developers may use existing toolchains (e.g., editor, compiler, debugger, etc.) and existing integrated development environments (IDEs) to manage, create and/or edit the source code. Development may now be efficiently performed in the source language, including testing and debugging. In a defined step in the development cycle, the code may be transcompiled and executed on other platforms afterwards.

Figure 3:
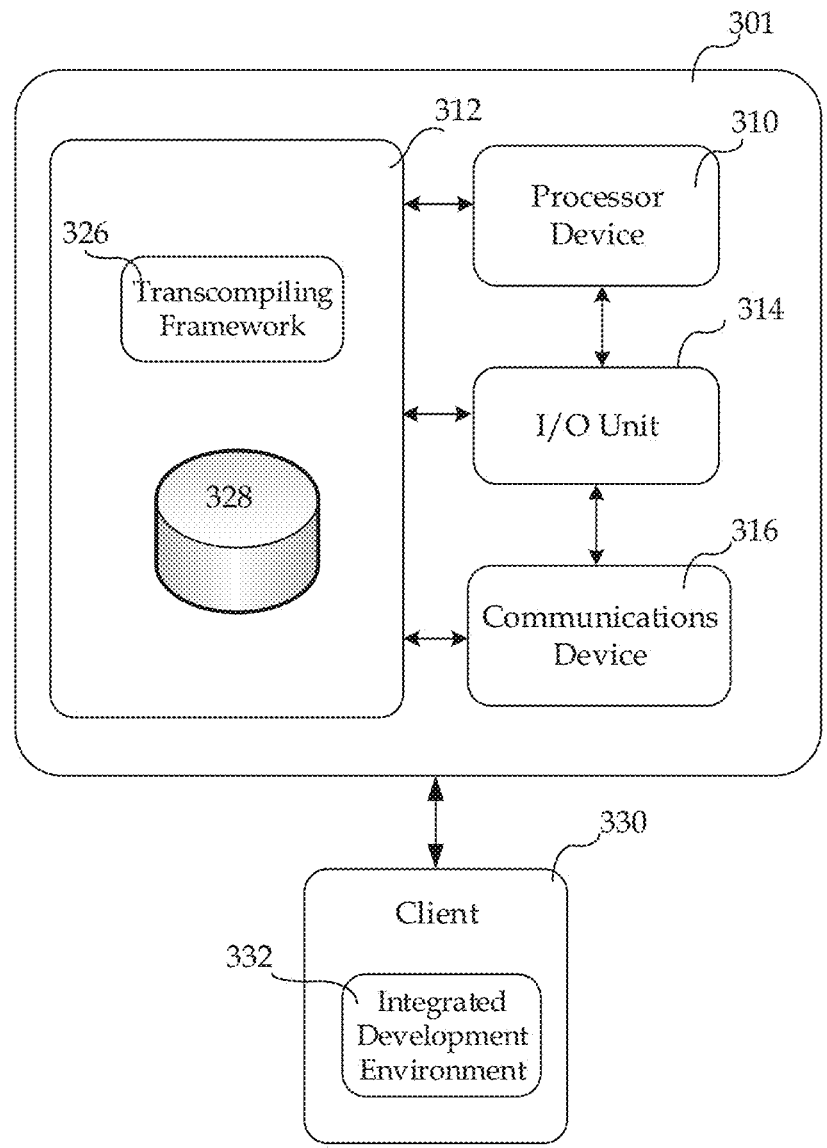
FIG. 3 is a block diagram illustrating an exemplary architecture.

FIG. 3 is a block diagram illustrating an exemplary architecture 300 in accordance with one aspect of the present framework. The architecture 300 includes a transcompiling system 301 communicatively coupled to a client system 330. For illustration purposes, only one client system 330 is shown. However, it should be appreciated that multiple client systems 330 may be communicatively coupled to the transcompiling system 301 using a client-server architecture. Alternatively, the transcompiling system 301 and client system 330 may reside in the same machine. For example, the transcompiling framework 326 may be integrated in the IDE 332 of the client system 330 as a plug-in.

The transcompiling system 301 can be any type of computer device capable of responding to and executing instructions in a defined manner, such as a workstation, a server, a portable laptop computer, another portable device, a mini-computer, a mainframe computer, a storage system, a dedicated digital appliance, a device, a component, other equipment, or some combination of these. The transcompiling system 301 may include a processor device 310, an input/output (I/O) unit 314, a memory module 312 and a communications (or interface) device 316 (e.g., modem and/or network adapter) for exchanging data with a network (e.g., local area network (LAN), wide area network (WAN), Internet, etc.). It should be appreciated that the different components and sub-components of the transcompiling system 301 may be located or executed on different machines or systems. For example, a component may be executed on many computer systems connected via the network at the same time (i.e., cloud computing).

Memory module 312 of the computer system 300 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof. The memory module 312 serves to store machine-executable instructions, data, and various software components for implementing the techniques described herein, all of which may be processed by the processor device 310. As such, the transcompiling system 301 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® SE, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, the memory module 312 of the transcompiling system 301 includes one or more components for implementing the techniques described herein, such as a transcompiling framework 326 and database 328. It should be appreciated that some or all of these exemplary components may also be implemented in another computer system (e.g., user or client device).

The transcompiling framework 326 is responsible for controlling the overall transcompilation process for a computer program. In some implementations, the transcompiling framework 326 converts source code written in a common denominator language (subset of features of a source language) into an abstract syntax tree (AST), and then converts the AST into the target source code in the target language. Such conversion may be performed using node adaptions on the generated AST and adaptions serializing the target source code from the AST. The transcompiling framework 326 may also ensure certain constraints are satisfied in order to reduce the supported feature set of the source language. These transformation and constraint checking steps from one source code in a source or master language to potentially multiple other target languages may be referred to herein as "transcompiling."

The one or more client systems 330 may interact with the transcompiling system 301 in order to request services from the transcompiling framework 326. The client system 330 may include components (not shown) similar to the transcompiling system 301, such as a processor device, an I/O unit, a communications device and a memory module. The client system 330 may be any type of computer device capable of responding to and executing computer readable instructions in a defined manner, such as a workstation, a server, a portable laptop computer, another portable device, a mini-computer, a mainframe computer, a storage system, a dedicated digital appliance, a device, a component, other equipment, or some combination of these.

In addition, the client system 330 may include an integrated development environment (IDE) 332 that allows a developer to work on a software project. The IDE 332 may include features for examining contents of a project, including browsing the files in the project or browsing the class hierarchy in the project. The IDE 332 may also include an error display for showing transcompiling errors in the project. Errors created during transcompilation may be displayed as normal compiling errors via IDE 332. The errors may be removed by fixing the code in the source file and running the transcompilation again. The IDE 332 may include a source code editor that allows the user to edit source files in a common denominator language. The IDE 332 may further include user interface elements (e.g., menu, drop boxes, etc.) to present various user-configurable options for transcompilation. For example, the user can select the source and one or more target platforms or programming languages.

Figure 4:
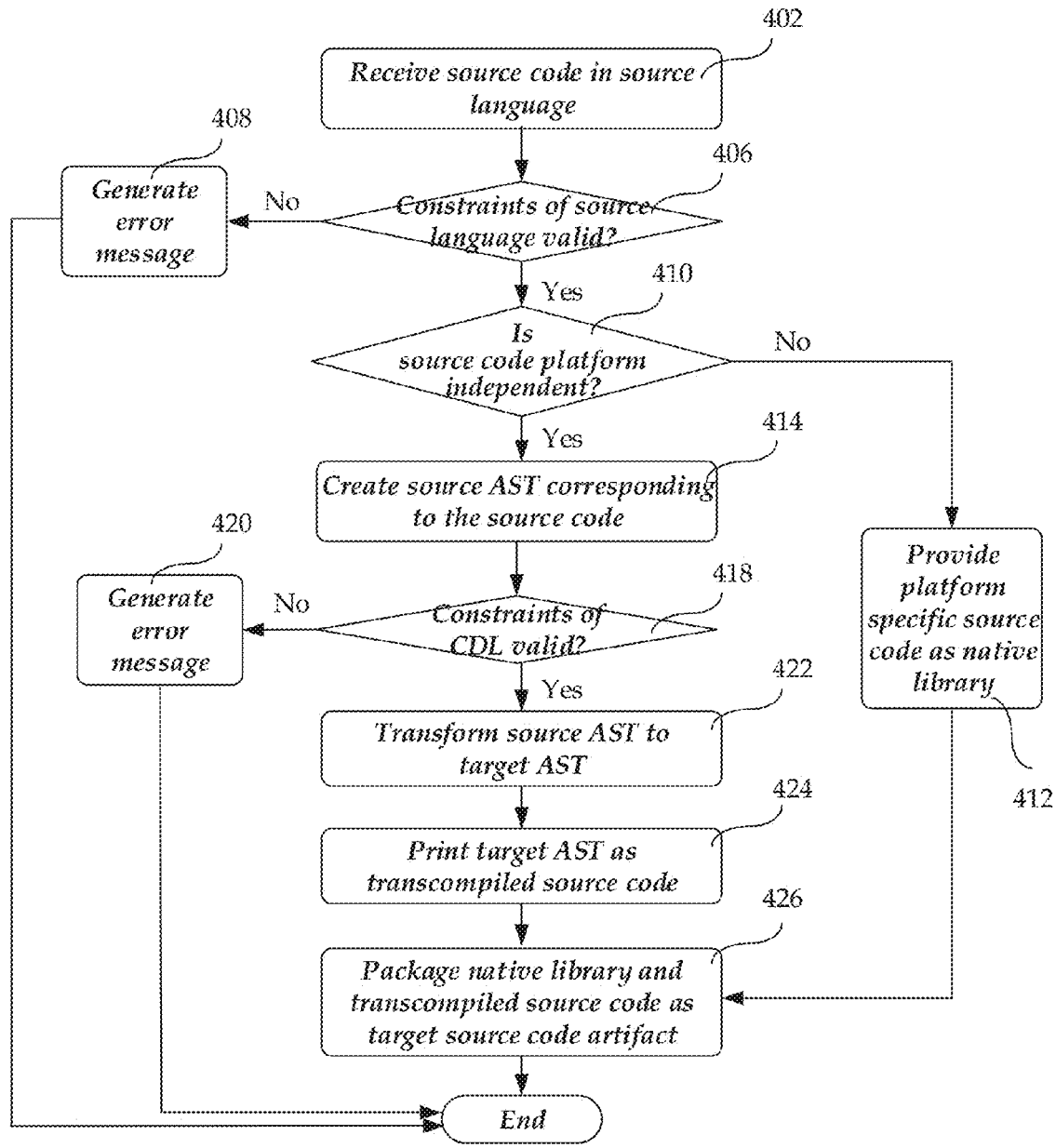
FIG. 4 illustrates exemplary steps performed at a transcompiling system.

FIG. 4 illustrates exemplary steps performed at the transcompiling system 301. It should be noted that in the following discussion, reference will be made, using like numerals, to the features described in FIG. 3.

At 402, the transcompiling framework 326 receives source code written in a source language from the client system 330. The transcompiling framework 326 may also receive a user selection of target programming languages to which the source code is to be transcompiled. For example, a user interface element (e.g., menu, drop-down list, etc.) may be displayed via the IDE 332 to indicate the available target languages that may be selected by the user or software developer. The user may then make the selection via the IDE 332.

At 406, the transcompiling framework 326 parses the source code and determines if the constraints associated with the source language are valid. The validation may include, for example, syntax and semantics verification, type checking, and so forth. The source code may be parsed and validated with an existing parser, such as the Eclipse Java parser or other Java compiler that checks whether standard Java constraints are valid.

If the constraints of the source language are not valid, at 408, the transcompiling framework 326 generates one or more error messages to indicate that transcompiling errors have occurred. The one or more error messages may be displayed at the IDE 332. The process 400 then ends.

If the constraints are valid, at 410, the transcompiling framework 326 determines whether the source code is platform independent. The source code is platform independent when it can run on any target software platform (e.g., C++, Objective C, Javascript, C#, etc.) with no or little modification. The determination can be made by parsing the source code for annotations that indicate if the code is platform independent or not. For example, a Java header comment to the class/interface (e.g., /** @X-PLAT-FORM_IMPLEMENTATION true */) may be detected. Alternatively, the source code may be structured into sub-projects that are annotated to contain only code that is either platform dependent or independent.

If the source code is dependent on the platform, at 412, the transcompiling framework 326 provides the platform dependent source code as a native library (i.e., without undergoing transcompilation). The platform dependent source code may be provided as one or more native target source code libraries for each target language. The API signatures may be the same for all target languages, even if the native API implementations are different.

If the source code is platform independent, at 414, a source abstract syntax tree (source AST) corresponding to the source code is generated. The source AST represents the abstract syntactic structure of the source code in the source language (e.g., Java). Other abstract syntax representations may also be used.

At 418, the transcompiling framework 326 parses the source AST to determine if constraints of the common denominator language (CDL) are valid (or satisfied). Only allowed and valid features are represented in a target abstract syntax tree (t-AST) in memory subsequently.

As discussed previously, the common denominator language is predefined by a reduced subset of features (or intersects) that are provided by a source language and reachable by all target languages. Whatever language is selected to be the source language, only the reachable intersects may be used. For example, in FIG. 1, intersect d cannot be used if language #1 is selected as the source (or master) language. The source language may be an object-oriented language, such as Java, Objective C, C++, C#, ABAP, Python, JavaScript, etc. Other types of source languages may also be used. The source code may include, for example, compilation units, such as Java classes or interfaces.

The source AST may be parsed to determine if constraints associated with this reduced feature set are valid. The constraints may include predefined restrictions on language expressions to transcompile the source code to multiple target languages (e.g., C++, C#, JavaScript, Objective C, ABAP, and Java). The transcompiling framework 326 may forbid specific expressions as specified by such predefined restrictions. Alternatively, the transcompiling framework 326 may emulate such expressions by extending or modifying the internal AST. The transcompiling framework 326 may check the parsed language against forbidden statements as specified by the restrictions.

Exemplary language expressions that are allowed may include, but are not limited to, single inheritance, interfaces, static and instance methods, simple generics, primitive types (e.g., void, int, long, float, double, boolean, string, etc.), for-loop, while-loop, if-condition, basic expressions with assign, comparison, boolean and mathematical operators, increment/decrement unary operator, method calls, exceptions (e.g., with limited set of exception types, created in a native library), basic constants (e.g., null, true, false, numbers, string literals, etc.).

Exemplary language expressions that are disallowed may include, but are not limited to, any Java language core library class (except Object and String), inner classes, constructors, method overloading, method return type that cannot be extended during inheritance ("return type co-variance"), multithreading (and the associated keywords), constants in interfaces, language elements using native interfaces or classes (e.g., the for each loop using iterators), keywords of all target languages as names, static blocks, reflection, dynamic proxying, language annotations, etc.

Restrictions that are specific to using the Java as a source (or master) language and C#, Objective C, ABAP, JavaScript, C++ as target languages may include, but are not limited to, the following:

1) a root class must always inherit from a default class (e.g., called XObject) which is defined in a native library;

2) a root interface must always inherit from a default interface (e.g., called IXObject) which is defined in a native library;

3) initialization of static non-primitive variables (or pointers) must be done explicitly and not in the header of a class, because undefined timing in other languages can result in dependency problems;

4) blocks in methods have only visual structuring character and do not restrict the scope of variables; local variables have to be unique on the method level or have to be renamed by the transcompiling framework;

5) strings cannot be treated as normal objects, hence collections must have special implementations for strings as keys or values;

6) for dynamic class, loading a special class wrapper is used; the Java class "Class" can only be used as a parameter; and 7) only unchecked exceptions can be thrown; the "throws" extension at methods is not allowed.

If the constraints of the CDL are not valid, at 420, the transcompiling framework 326 generates one or more error messages to indicate that transcompiling errors have occurred. The one or more error messages may be displayed at the IDE 332. The process 400 then ends.

If the constraints of the CDL are valid, at 422, the transcompiling framework 326 transforms the source AST to a target AST (i.e., t-AST) that is independent of the source AST. Valid parts of the source AST that satisfy the CDL constraints are mapped into the t-AST. For each target language (e.g., Java and C#), a new t-AST may be constructed, as target-specific renaming and transformations may occur for each t-AST. Once the t-AST exists in memory, modifications dependent on the target language are performed before the t-AST is converted into target language expressions. Besides modifications, extended information may also be collected and stored as, for example, type names inside a class. This can be used to create flexible printers that can lookup additional information which are not necessary in the source language, but helpful in others.

At 424, transcompiling framework 326 prints the target AST (t-AST) as transcompiled source code in the target language. When the modification and extension of the t-AST is completed, a target source code printer in the transcompiling framework 326 may recursively apply, for example, a Visitor pattern over the t-AST and generate the specific target language expressions. The target language expressions may then be displayed via IDE 332.

Figure 5:
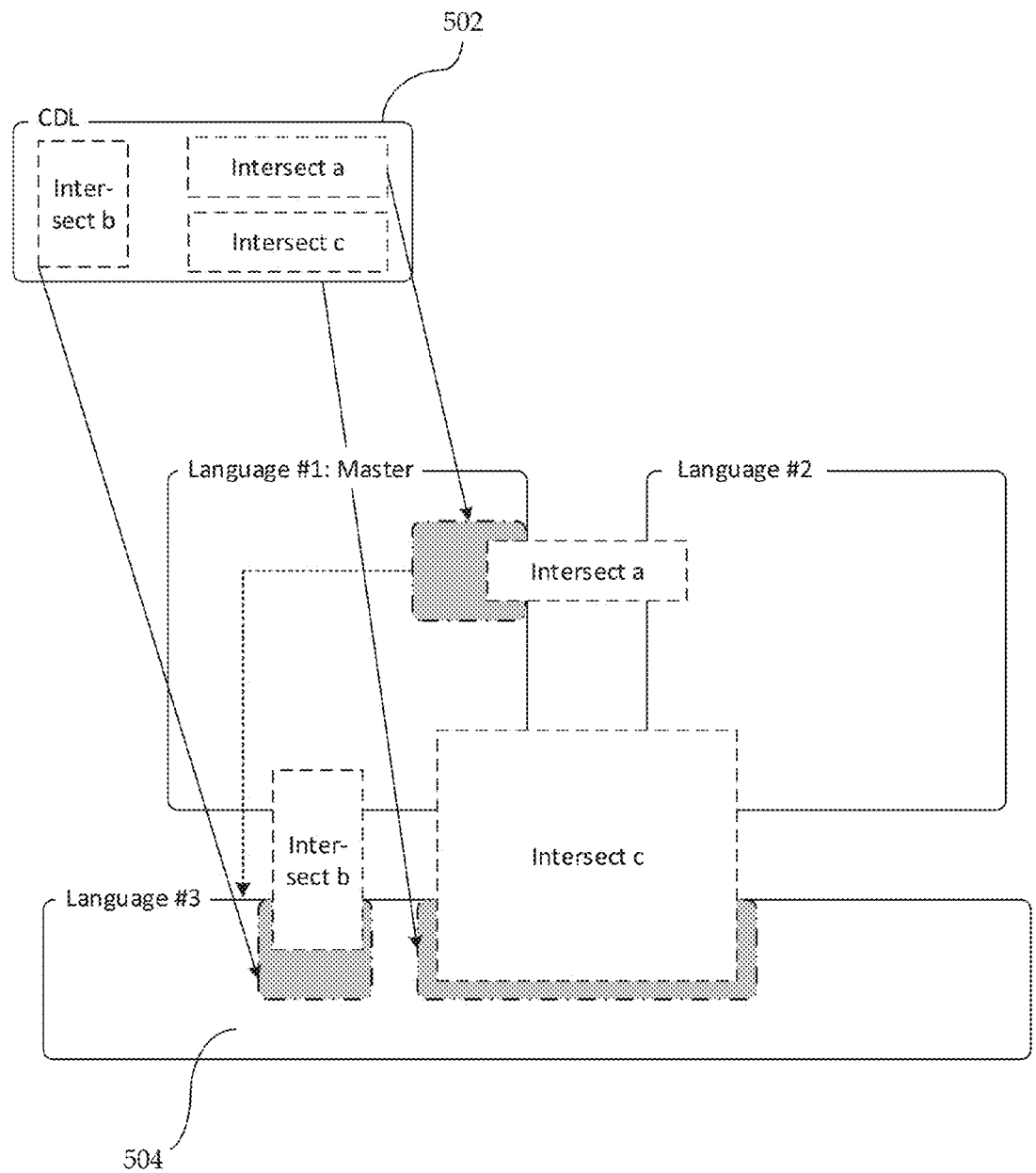
FIG. 5 illustrates an exemplary back-transformation from the CDL to a target language.

FIG. 5 illustrates an exemplary back-transformation from the CDL (502) to the target language #3 (504). Intersects b and c of the CDL are back-transformed to corresponding features in the target language #3, and intersect a is back-transformed to a feature in the master language, which is further mapped to a feature in target language #3. The back-transformation may be performed by using language-specific printers. For example, the language-specific printer may follow one or more predefined rules (e.g., in a configuration file) to match a t-AST node type with a target string. The t-AST may be traversed recursively depth-first, with a writer on each node deciding whether and when to traverse deeper into the tree and to lookup higher parts of the tree to identify the context of its own node.

Returning to FIG. 4, at 426, the transcompiling framework 326 packages the platform-specific native library and/or transcompiled source code as a target source artifact. The target source artifact may then be archived in, for example a file system or database 328 for use by client applications. One or more messages may be displayed at the IDE 332 to indicate that the transcompilation process is successful.

In some implementations, the native library and transcompiled source code is packaged as a layered target source artifact. Some of these layers are intended to be wrapper-like API abstractions for core data structures and I/O libraries of the native target platforms. This approach relies on proprietary library implementations to allow optimization for the platforms' common denominator. The core libraries are created by stacking native and transcompiled source codes over each other, where each layer is clearly isolated and has a specific layer type. In other implementations, native and non-native codes are mixed class-by-class.

Figure 6:
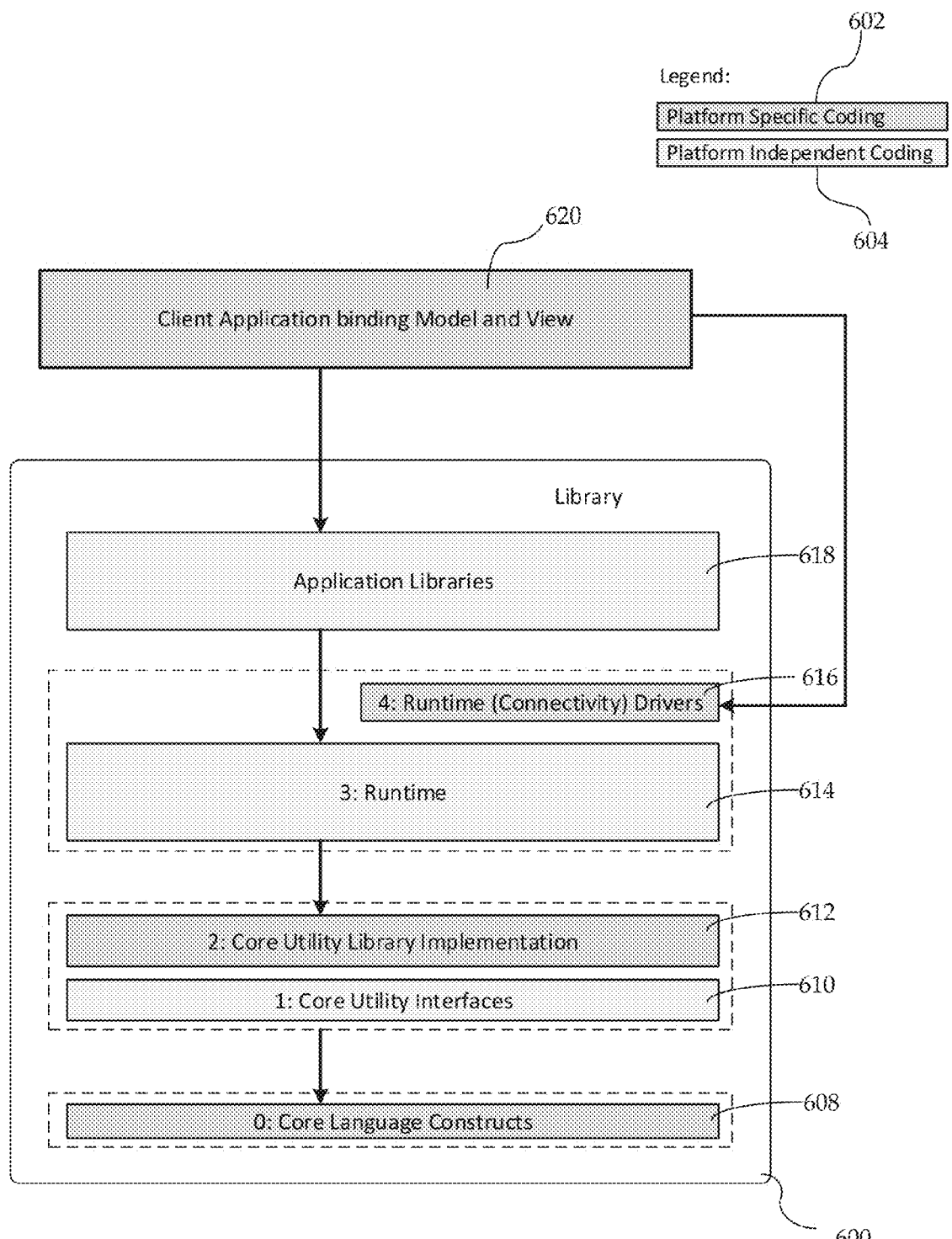
FIG. 6 shows an exemplary sandwich structure of native platform specific and transcompiled platform independent libraries.

FIG. 6 shows an exemplary sandwich structure 600 of native platform specific and transcompiled platform independent libraries. It should be appreciated that there may be many other combinations of platform dependent and independent layers to support a sophisticated dependency chain to minimize the amount of native code.

As shown, the sandwich structure 600 may include two different layer types: (1) platform specific layers 602; and (2) platform independent layers 604. The platform specific layers 602 include code which cannot be transcompiled, but has to be provided as native target source code. Inside a platform specific layer, there may be a differentiation between a native API (may be used in this layer and all other dependent layers) and a native implementation (may only be used in this layer). The platform independent layers 604 include code that is completely transcompiled and can be fully reused.

The transcompiling framework 326 may check certain constraints for code visibility and usage based on the different layer types. The layered type of source code may by defined by annotations and project settings. The implementation code in any layer is allowed to use visible code from its own layer and all other required layers. If a required layer is platform-dependent, only the API part may be used. The API part of classes and methods in the native layer of the source language are marked to be API. In the source language, there may be more classes and methods available. If they are not marked as API, however, they are not allowed to be used, because they will not exist on other platforms.

As shown in FIG. 6, the sandwich structure 600 of the library may include layers for: (0) native core language constructs 608 that provide support for primitive types (e.g., String, Integer, etc.), exceptions and weak references; (1) transcompiled core utility interfaces 610 that provide access to constants, collections, memory management, error handling, processing features; (2) Native core utility library implementation 612; (3) transcompiled runtime interfaces and implementation 614 for common application framework; (4) native input/output (I/O) implementation of runtime (connectivity) drivers 616; and (5) transcompiled application-specific high-level libraries 618. Other layers (not shown), such as a transcompiled core extension layer that provide collections and utilities based on the native implementations and transcompiled I/O interfaces, may also be provided.

Application code 620 may not directly access the native libraries, but may use the wrapper-APIs in the platform independent application libraries 618 to access a well-defined common subset of different native target platforms for algorithmic utilities (e.g., lists or maps) and input/output drivers. Application code 620 may also directly access the native runtime drivers 616. Native code given by the platform is allowed to be used directly by application code 620.

To support a new target language, a new configuration file may be added to, for example, database 328, for use by transcompiling framework 326. In some implementations, transcompiling framework 326 replaces string patterns (or keywords) in the source language (e.g., JavaScript) with keywords stored in the configuration file to derive the target language (e.g., Python). Transcompiling framework 326 may also rename identifiers in the source language according to rules in the configuration file to derive the target language. For example, the rules may define reserved words, naming conventions or length restrictions that need to be applied in deriving the target language. The rules in the configuration file may also define how often and in which order transcompiling framework 326 should traverse the source AST, while creating the target AST for a dedicated target language artifact. For example, the target language may require all local variables of a certain method to be declared at the beginning of the method body, while the source language allows the local variables to be declared anywhere in the method body.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of transcompilation, comprising:
receiving source code written in a source language;
in response to determining that the source code is platform independent, generating a source abstract syntax tree corresponding to the the source code;
determining a common denominator language with a language feature set that is reduced to include only common language patterns that are supported by multiple platforms, wherein the common denominator language comprises a set of intersects that are provided by the source language and are reachable by multiple target languages;
determining that constraints associated with the common denominator language are satisfied by parsing the source abstract syntax tree;
in response to determining that the constraints are satisfied, transforming the source abstract syntax tree to a target syntax tree associated with at least one of the multiple target languages;

printing the target syntax tree as transcompiled source code in the at least one of the multiple target languages; and packaging the transcompiled source code as a target source artifact.

2. A system, comprising:

a non-transitory memory device for storing a computer-readable program code; and a processor in communication with the memory device, the processor being operative with the computer-readable program code to:

generate a source abstract syntax representation corresponding to source code written in a source language, determine a common denominator language with a language feature set that is reduced to include only common language patterns that are supported by multiple platforms, wherein the common denominator language comprises a set of intersects that are provided by the source language and are reachable by multiple target languages, parse the source abstract syntax representation to determine that constraints of the common denominator language are satisfied, in response to determining the constraints are satisfied, transform the source abstract syntax representation to a target syntax representation associated with at least one of the multiple target languages, print the target syntax representation as transcompiled source code in the at least one of the multiple target languages, and package the transcompiled source code as a target source artifact.

3. The system of claim 2 wherein the common denominator language is based on Java or JavaScript.

4. The system of claim 2 wherein the source language is Java and the at least one of the multiple target languages is C#, Objective C, ABAP, JavaScript or C++.

5. The system of claim 2 wherein the set of intersects comprises classes, variables, conditions, objects, loops, primitive data types, behavior, or a combination thereof.

6. The system of claim 2 wherein the processor is operative with the computer-readable program code to parse the source code and determine validity of constraints associated with the source language.

7. The system of claim 2 wherein the processor is operative with the computer-readable program code to determine whether the source code is platform independent or dependent by parsing the source code for annotations that indicate that the source code is platform independent or dependent.

8. The system of claim 7 wherein the processor is operative with the computer-readable program code to generate the source abstract syntax representation in response to a determination that the source code is platform independent.

9. The system of claim 2 wherein the processor is operative with the computer-readable program code to determine validity of constraints of the common denominator language by checking against predefined restrictions on language expressions.

10. The system of claim 9 wherein the predefined restrictions allow single inheritance, interface, static and instance method, simple generics, primitive type, for-loop, while-loop, if-condition, basic expression with assign, comparison, boolean and mathematical operator, increment/decrement unary operator, method call, exception, basic constant, or a combination thereof.

11. The system of claim 9 wherein the predefined restrictions disallow Java language core library class, inner class, constructor, method overloading, method return type that cannot be extended during inheritance, multithreading, constant in interface, language element using native interface or class, or a combination thereof.

12. The system of claim 2 wherein the processor is operative with the computer-readable program code to generate one or more error messages in response to determining the constraints are not satisfied.

13. The system of claim 2 wherein the processor is operative with the computer-readable program code to transform the source abstract syntax representation to multiple target syntax representations associated with the multiple target languages.

14. The system of claim 2 wherein the processor is operative with the computer-readable program code to transform the source abstract syntax representation to the target syntax representation by mapping valid parts of the source abstract syntax representation that satisfy the constraints into the target syntax representation.

15. The system of claim 2 wherein the processor is operative with the computer-readable program code to transform the source abstract syntax representation to the target syntax representation based on one or more predefined rules in a configuration file.

16. The system of claim 2 wherein the processor is operative with the computer-readable program code to print the target syntax representation by matching a node of the target syntax representation to a target string in accordance with one or more predefined rules.

17. The system of claim 2 wherein the processor is operative with the computer-readable program code to package the transcompiled source code with at least one native library as a layered target source artifact.

18. A non-transitory computer-readable medium having stored thereon program code, wherein the program code is executable by a computer to:

generate a source abstract syntax representation corresponding to source code written in a source language;

determine a common denominator language with a language feature set that is reduced to include only common language patterns that are supported by multiple platforms, wherein the common denominator language comprises a set of intersects that are provided by the source language and are reachable by multiple target languages;

determine that constraints of the common denominator language are satisfied by parsing the source abstract syntax representation;

in response to determining the constraints are satisfied, transform the source abstract syntax representation to a target syntax representation associated with at least one of the multiple target languages;

print the target syntax representation as transcompiled source code in the at least one of the multiple target languages; and package the transcompiled source code as a target source artifact.

19. The non-transitory computer-readable medium of claim 18 wherein the common denominator language is based on Java or JavaScript.

20. The non-transitory computer-readable medium of claim 18 wherein the program code is executable by the computer to determine validity of constraints of the common denominator language by checking against predefined restrictions on language expressions.

* * * * *